350-377
SR
XR 3,480,933
SEARCH ROOM
CROSS REFERENCE

Nov. 25, 1969 D. TREVES 3,480,933

SPATIAL FILTERING NOISE REDUCTION SCHEME FOR A MAGNETOOPTIC READOUT SYSTEM

Filed Oct. 12, 1966

INVENTOR.
DAVID TREVES
BY Robert G. Clay
ATTORNEY

3480933
OR IN 360/114

3,480,933

SPATIAL FILTERING NOISE REDUCTION SCHEME FOR A MAGNETOOPTIC READOUT SYSTEM

David Treves, Palo Alto, Calif., assignor to Ampex Corporation, Redwood City, Calif., a corporation of California Filed Oct. 12, 1966, Ser. No. 586,255
Int. Cl. G11b 5/00; G02f 1/22
U.S. Cl. 340—174.1 4 Claims

ABSTRACT OF THE DISCLOSURE

An optical iris is disposed at a preselected position in the viewing optical branch of a magnetooptic readout system, wherein the position and size of the iris is chosen to remove from the overall reflected beam the noise originating from surface imperfections in the storage medium. The positioning of the iris takes advantage of the fact that the surface imperfections cause scattering of the light in a larger solid angle than the angle imparted to the light which forms the main information carrying beam.

The invention herein described was made in the course of a contract with the Department of United States Army.

The present invention relates generally to magnetooptic readout systems and more particularly to a spatial filtering noise reduction scheme for improving the signal-to-noise ratio for a magnetooptic readout system.

Magnetooptic readout systems provide a means whereby magnetic recordings of high bit densities may be accurately and rapidly retrieved. In the magnetooptic readout technique as presently known and as shown for example in, U.S. Patent No. 3,171,754 issued March 2, 1965, and assigned to the same assignee of the present application, U.S. Patent 3,268,879 issued August 23, 1966, and an article "Magnetooptical Readout" by T. Lentz and J. Miyata, Electronics, September 1, 1961, pages 36–39, the Kerr or Faraday magnetooptical effect is utilized to detect the presence of magnetic recordings stored in the recording medium.

By way of example, the Kerr magnetooptical effect is exhibited by a magnetic surface which is illuminated by a beam of polarized light. The plane of polarization of the beam reflected from the surface magnetized in one direction is rotated with respect to the plane of polarization of light reflected from a surface magnetized, for example, in the opposite direction such as is commonly done in digital recording. To illustrate, when the polarized beam is reflected from a portion of the magnetized surface having a positive magnetic bit stored therein, the plane of polarization of the reflected beam is rotated through a particular angle. However, when the polarized beam is reflected from a stored negative magnetic bit, the plane of polarization of the reflected beam is rotated through a different angle generally anti-symmetrical or opposite to the positive bit rotation angle. Thus, the presence of a positive or a negative bit stored in the storage medium may be readily detected by sensing the degree and/or angle of rotation of the plane of polarization of the reflected beam.

In designing such magnetooptic readout systems, consideration must be given to the various noise sources in the system. Such noise sources consist of generally: shot noise in the light detector; regular noise which includes all spurious fluctuations in the light level that reach the photomultiplier which are independent of the state of magnetization of the storage media, and which are generally due to surface imperfections and light source fluctuations; and modulation noise which appears as random modulation of the signal due to light source and reflectivity fluctuations.

It has been found that regular noise due to recording medium surface noise constitutes a large portion of the noise which is detrimental to, and results in a decrease of, the signal-to-noise ratio of the readout system. Since a large improvement in the signal-to-noise ratio would make the entire concept of magnetooptic readout considerably more practical and would result in a relatively feasible readout system, any means by which the signal-to-noise ratio of the readout system can be improved is highly desirable.

Accordingly, the present invention provides a method and apparatus for improving the operation of a magnetooptic readout system by providing a relatively simple, spatial filtering noise reduction scheme for radically improving the signal-to-noise ratio of the readout system.

It is thus an object of the invention to provide a spatial filtering noise reduction scheme for magnetooptic readout systems which is capable of filtering out the surface noise inherent in the readout system to thereby improve the signal-to-noise ratio thereof.

It is another object of the invention to provide a spatial filtering noise reduction scheme utilizing an optical device for filtering out the noise carrying beam portion of the overall reflected beam to remove the surface noise originating from imperfections in the storage medium.

It is a further object of the invention to provide a method and apparatus for spatially filtering noise in a magnetooptic readout system utilizing an iris disposed at a pre-selected position in the viewing optical branch of the system.

Other objects and advantages will be apparent from the following description taken in conjunction with the drawings in which.

Figure 3:
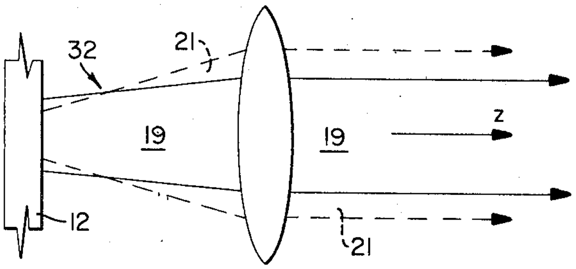
Figure 4:
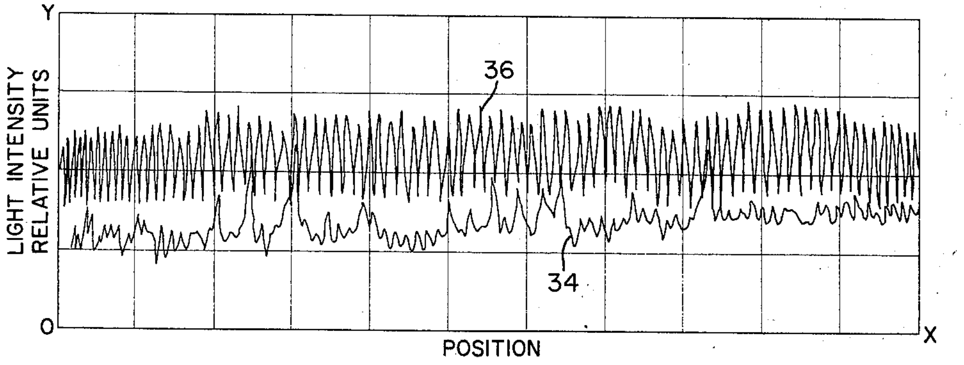

FIGURE 3 is a graph depiciting in simplified form the geometrical divergence of a main beam portion and of a noise carrying beam portion which portions together constitute the overall reflected lighted beam, wherein the noise carrying beam portion is formed of the light diffracted by relatively small surface imperfections in the storage medium; and FIGURE 4 is a graph showing a comparison of a filtered and unfiltered scan illustrating the effects of spatial filtering performed in accordance with the invention.

The spatial filtering method of the invention takes advantage of the fact that the geometrical dimensions of the surface scatterers or imperfections are appreciably smaller than the information bit dimensions or the light spot dimensions. These small scatterers diffract light in a larger solid angle than the angle imparted to the light forming the main beam, thus defining the noise carrying beam of previous mention. In the region of Fraunhofer diffraction, such as by way of example only, in an objective lens' back focal plane, further described infra, the energy is spread in a diameter roughly equal to $\lambda f d^{-1}$ where $d$ is the general dimension of the scatterer $d_n$, or of the information bit $d_i$, $f$ is the focal length of the objective lens and $\lambda$ is the wave length of the light. Accordingly, there is provided a noise rejection of the order of magnitude of $(d_n)^2/d_i$, in one embodiment of the invention, by disposing in the back focal plane of an objective lens an iris with diameter equal to $\lambda f d_i^{-1}$. In general, introduction of an iris with appropriate dimensions in one of various possible positions in the viewing optical branch of the apparatus will eliminate most of the noise due to the imperfections having dimensions smaller than the dimensions of the bits of information, without appreciably losing any light forming the main beam, which beam contains the information representing the bits stored in the magnetic storage medium.

Figure 1:
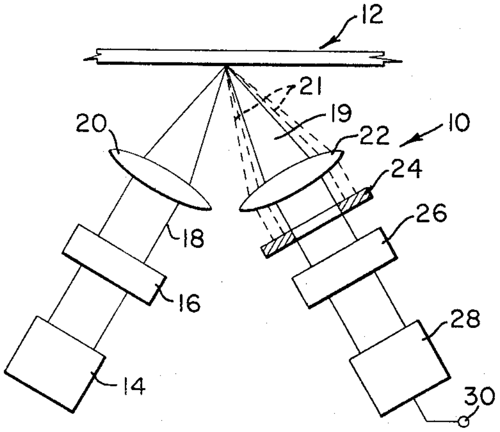
FIGURE 1 is a schematic diagram showing apparatus which may be utilized in conjunction with the method of the invention.

Accordingly, referring to FIGURE 1 there is shown by way of example only, apparatus for performing the method of the invention wherein a magnetic storage medium 12 is to be scanned. A source of high energy light such as a laser 14 is disposed to direct a beam of light through a polarizer 16, such as for example, a Nicol prism or a Polaroid sheet. The resultant linearly polarized beam of light, indicated by numeral 18 herein, is directed through a converging condenser lens 20, which focuses the beam on the surface of the storage medium 12 in the form of a spot of selected dimensions, wherein by way of example only the selected dimensions may be made equal to the bit dimensions in the most practical applications of the invention. The incident beam is reflected from the medium 12 in the form of a "main" or "information" beam 19 which is overlapped by a "noise" beam 21, and the combined reflected beam through an objective lens 22, where it is preferably collimated into a parallel beam of light. The beam is directed through a spatial filter or iris 24 wherein a large amount of the noise beam 21 is removed in accordance with the invention, and the remaining light consisting mainly of the information beam 19 is then introduced to an analyzer 26. Analyzer 26 may be also a Nicol prism or a Polaroid sheet. Means for sensing the amount of light passed by the analyzer 26, such as for example, a photomultiplier 28, is disposed behind the analyzer to receive the light beam therefrom. The electrical output signal from photomultiplier 28, introduced to a terminal 30 connected thereto, is proportional to the amount of light received from the analyzer 26. The noise carrying beam 21 of the reflected beam which is generated by the small surface scatterers and which is diffracted therefrom in the relatively larger solid angle as depicted in FIGURES 1 and 2, is in large part intercepted and removed by the annular iris 24, which in this particular embodiment is placed at the objective lens' back focal plane, i.e., at a position which lies in the region of Fraunhofer diffraction.

The iris 24 configuration takes advantage of the fact that information beam 19 is reflected from the medium 12 in a generally smaller solid angle, and the noise carrying beam is diffracted in a relatively larger solid angle and which has a diverging circumference which extends beyond the circumference of the information beam 19. Thus the iris 24, in accordance with the invention concepts, is a spatial light filter or kind of light stop of selected shape and dimensions which will transmit the entire or a selected cross section of the information or main beam 19 while intercepting and thus filtering out the portion of the noise carrying beam 21 located circumjacently thereabout.

Figure 2:
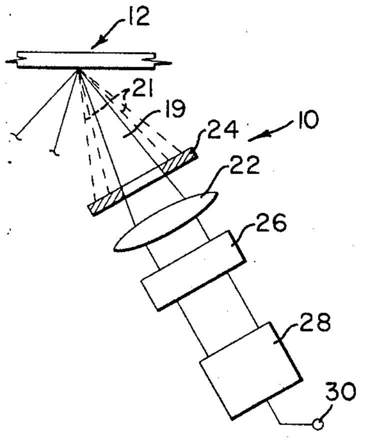
FIGURE 2 is a schematic diagram showing an alternative arrangement of the apparatus of FIGURE 1.

By way of example only, the iris 24 is herein placed behind the objective lens 22 in the Fraunhofer region as shown in FIGURE 1, wherein however, the iris 24 could be placed directly in the path of the reflected beam and in front of the objective lens 22 such as shown in FIGURE 2. In the latter embodiment, the iris must be disposed along the reflected beam at a distance $Z > d_i^2/\lambda$ where $d_i$ is the diameter of the inforamtion bit and $\lambda$ is the light wavelength. The iris inner diameter then has to be of the order of $\lambda z/d_i$.

By way of example only, the various dimensions of an operable system in accordance with the invention may be as follows: With a diffraction limited spot of 50 microns for illuminating for example, 50 micron information bits recorded in the magnetic surface of medium 12, and light having a wavelength of $\lambda = 0.5$ micron, the iris must be placed at a distance $z$ from the medium 12 greater than $d_i^2/\lambda = 5000$ microns. An iris 24 placed for example 10 cm. from the reflecting surface of medium 12 will then require an inner diameter of the order of $\lambda z/d_i = 0.1$ cm.

The placement of the iris 24 may be visualized by referring to FIGURE 3 which is a simplified graph depicting the relative geometrical divergence of the information beam 19 and the noise beam 21 upon diffraction from the medium 12 at their respective small and large solid angles. It may be seen that the iris 24 must be placed along the reflected beam at a distance $z$ greater than the point 32, where the light forming the noise beam 21 crosses the light which forms the information beam 19. In the embodiment of FIGURE 1 where the iris 24 is located behind the objective lens 22, it may be placed at any position therealong as long as the beams are parallel. In the event the beams are re-focused in converging beams by the objective lens 22 (not shown), the iris must be placed relatively adjacent the lens 22 and thus a relatively large distance from the point where the beams 19 and 21 cross each other. As exemplified in FIGURE 3, $d_i$ is the dimension of the information bit and $d_n$ is the dimension of the light scatterer or imperfection. In a readout system employing a circular beam spot and circular iris $d_i$ and $d_n$ represent diameters, however in a system using an elliptical spot and iris $d_i$ and $d_n$ represent dimensions of the ellipses.

Although the spatial filtering concept is herein described in conjunction with a magnetooptic readout system of particular configuration, utilizing a laser light source which is linearly polarized to allow readout of a magnetic medium, it is to be understood that the invention concepts are equally adaptable to light sources other than lasers, to light beams which are not necessarily linearly polarized, and to light beams which have an elliptical cross section. Additionally, although the inner diameter (or elliptical dimensions) of the iris 24, shown for example in FIGURES 1 and 2, is depicted equal to the diameter (or elliptical dimensions) of the main or information beam 19, it may be made smaller than the beam 19 diameter or dimensions to thus remove a portion of the outer periphery of the information beam, thereby insuring the removal of as much of the noise carrying beam as is possible.

The iris 24 may be made for example, by forming an aperture of desired size and shape in a plate of opaque material to define thus a fixed iris of the type generally known in the art. However, the iris could also be a variable-aperture iris of conventional design. The other components shown for example in FIGURE 1 are of conventional design and known in the optical art and are thus not further described herein.

Referring now to FIGURE 4 there is shown the results provided by the spatial filtering method and apparatus of the invention, commensurate with the radical improvement in the signal-to-noise ratio. The figure shows two scans 34 and 36 of 6.25 micron bits with the analyzer 26 set near extinction. The illuminating spot size impinged upon the medium 12 is $7 \times 200$ microns. Both scans 34 and 36 were taken under conditions which were identical in every respect except that the scan 34 was taken with no spatial filtering, and the scan 36 was taken with spatial filtering utilizing an iris 24 in accordance with the invention, and an electronic gain 5 times larger than that used in taking scan 34. It may be seen that there is no loss in the absolute value of the information signal while a noise reduction of two orders of magnitude is provided.

While the invention has been described herein with respect to various embodiments, it is to be understood that additional modifications could be made within the spirit of the invention. That is, the iris 24 light spot, and information bit do not necessarily have to be circular, but could have various other shapes such as for example, elliptical, etc., wherein the linear dimensions of the various iris, spot, bits, etc., are related by the same equations hereinbefore set forth. Additionally, although the invention has been described in conjunction with the Kerr effect, the Faraday effect may be employed instead, wherein the light passes through the storage medium 12 and accordingly, the viewing branch of the apparatus is disposed on the side of the medium 12 opposite that of the light generating branch. Thus it is not intended to limit the scope of the invention except as defined in the following claims.

What is claimed is:

1. In a magnetooptic readout system including, means for directing a linearly polarized beam of light against a recording medium, said means for directing defining a light generating branch of said readout system, and means for viewing the light reflected from the recording medium to determine the degree of rotation of the plane of polarization of the linearly polarized light upon reflection thereof from the recording medium, said means for viewing defining a light viewing branch of said readout system, wherein the light reflected from the recording medium includes an information carrying main light beam and a noise carrying light beam of relatively larger solid angle than the angle imparted to the main beam, wherein the medium has information recorded thereon in the form of bits, the improvement of a spatial filter noise reduction apparatus comprising; a light filter including an iris of selected size and shape disposed in the viewing branch of the magnetooptic readout system at a preselected distance from the recording medium and adapted to intercept a substantial portion of the noise carrying beam and to pass a major portion of the information carrying main beam of the combined reflected light beam.

2. The apparatus of claim 1 wherein said iris is disposed in the viewing branch in the region of Fraunhofer diffraction.

3. The apparatus of claim 2 wherein the viewing branch includes an objective lens, and said iris is disposed in the back focal plane of the lens, said iris comprising an opaque plate of material defining an annular shape, wherein the inner dimension D of the iris is of the order of $\lambda f d_i^{-1}$, wherein $\lambda$ is the wavelength of light, $f$ is the focal length of the objective lens, and $d_i$ is the dimensions of the illuminated information bit.

4. The apparatus of claim 2 wherein the iris is disposed directly in the path of the combined reflected light beam at a distance $z=d_i^2/\lambda$ from the recording medium, the iris comprising an opaque plate of material defining an annual form, wherein the inner dimension D of the iris is of the order of $\lambda z/d_i$, wherein $\lambda$ equals the wavelength of the light, $z$ equals the distance of the iris from the recording medium, and $d_i$ equals the dimension of the illuminated information bit.

References Cited

UNITED STATES PATENTS 3,283,644 11/1966 Saltzman ............ 88—14

OTHER REFERENCES

Archibald, Conger, Sharp and Tomlinson, "High Speed Magnetooptical Measurements on Films," The Review of Scientific Instruments, vol. 31, No. 6, June 1960, p. 653.

Green and Prulton, "Magneto-optic Detection of Ferromagnetic Domains Using Vertical Illumination," Journal of Scientific Instruments, vol. 39, No. 5, May 1962, pp. 244–245.

Bebb, "A Polarimetric Method of Measuring Magneto-Optic Coefficients," IBM Journal of Res. and Dev., vol. 6, October 1962, pp. 456–458.

Supernowicz, "Magneto-Optical Readout From A Magnetized Nonspecular Oxide Surface," Journal of Applied Physics, vol. 34, No. 4 (Part 2), April 1963, pp. 1110–1111.

BERNARD KONICK, Primary Examiner

J. I. ROSENBLATT, Assistant Examiner

U.S. Cl. X.R.

350—151